April 21, 1953 W. P. CROPPER ET AL 2,635,749
CATALYST SEPARATION
Filed Sept. 29, 1949 3 Sheets-Sheet 1

INVENTORS:-
George E. Schmitkons
Wendell P. Cropper
BY
Vandeveer Voorhees
ATTORNEY April 21, 1953 W. P. CROPPER ET AL 2,635,749
CATALYST SEPARATION
Filed Sept. 29, 1949 3 Sheets-Sheet 3

INVENTORS:-
George E. Schmitkons
Wendell P. Cropper
BY
Vanderveer Voorhees
ATTORNEY Patented Apr. 21, 1953

2,635,749

UNITED STATES PATENT OFFICE 2,635,749

CATALYST SEPARATION

Wendell P. Cropper, Lansing, and George E. Schmitkons, Flossmoor, Ill., assignors to Standard Oil Company, Chicago, Ill., a corporation of Indiana Application September 29, 1949, Serial No. 118,667

9 Claims. (Cl. 209—127)

1

This invention relates to a method of separating active from inactive inorganic oxide catalysts in finely divided form and to an apparatus for carrying out the operation. More specifically the invention relates to the separation of "dead" catalyst particles from finely divided cracking catalysts of the type of active silica, alumina, magnesia, and other metal oxides or mixtures thereof activated with boron oxide, zirconia, thoria, vanadia, molybdena, chromium oxide, and the like. Natural catalysts such as acid treated clays, bentonites, montmorillonite, etc., are also subject to treatment by this process.

In the conversion of hydrocarbon oils with dispersed inorganic oxide catalysts, wherein the hydrocarbon is contacted at high temperature, usually 750 upwards to 950 or 1000° F., it is common practice to regenerate the catalyst at frequent intervals by burning off deposits of carbonaceous matter and to return the catalyst to the reaction zone for contacting further quantities of hydrocarbons. In the "fluid catalyst" process employing powdered catalyst, the reaction and regeneration are carried on continuously with circulation of catalyst between the reaction and the regeneration zones. "Spent" catalyst flowing from the reaction zone is stripped with steam or inert gas to remove volatile hydrocarbons before regeneration. When cracking heavier oils such as gas oil into gasoline, catalysts employed are usually of the siliceous type and may be either natural or synthetic. Natural catalysts characterized by Super Filtrol, an acid treated clay of the montmorillonite type, are largely active forms of silica with minor amounts of aluminum oxide and other metal oxides.

Synthetic cracking catalysts are generally prepared from silica gel with which is associated by impregnation or cogelling, oxides of the character of aluminum oxide, vanadium oxide, boron oxide, magnesium oxide, etc., the amount of the secondary oxide or promoter being usually about 5 to 25 per cent of the weight of the catalyst.

One of the characteristics of these catalysts is that after they have been in use for a considerable period of time, for example 1000 to 5000 hours, involving hundreds of regenerations in which the carbon is burned from the catalyst at temperatures of the order of 1000 to 1200° F., it has been found that the catalyst suffers a permanent loss of activity. Thus where a new catalyst may have an activity of 100 IRA (Indiana Relative Activity—see Shankland and Schmitkons—Proc. API—27 III (1947) pages 57–77) the catalyst may average only about 10 to 20 IRA after extensive

2 use and periodic addition of fresh catalyst to make up for losses. It then becomes necessary to discard catalyst and add new catalyst to maintain the desired conversion operation. This catalyst withdrawal is in addition to the fine catalyst lost from the process while the catalyst is being blasted with air in the regeneration operation.

It has now been found that the discarded catalyst is a mixture of particles of almost totally inactive or "dead" catalyst and particles which still have a relatively high activity, altho all gradations of activity are represented. The principal object of this invention is to effect a separation between the dead catalyst and the active catalyst in the discard and return the active fraction to the conversion operation, discarding only the dead catalyst. By this means, the life of the catalyst is greatly increased and the cost of the conversion operation is substantially reduced. Less make-up catalyst is required and the activity level of the catalyst in the conversion unit can be raised.

A more specific object of the invention is to effect the elimination of inactive from active catalyst in a continuous manner, thereby maintaining a higher level of catalyst activity in the conversion operation. Another object is to effect separation of active and inactive catalyst by application of an electrostatic field to this problem. Still another object is to provide an electrostatic apparatus for the purpose. Other objects of the invention will be apparent from the following description thereof.

The invention is illustrated by drawings which show in

Figure 1 a diagrammatic representation of an electrokinetic catalyst separator;

Figure 1:
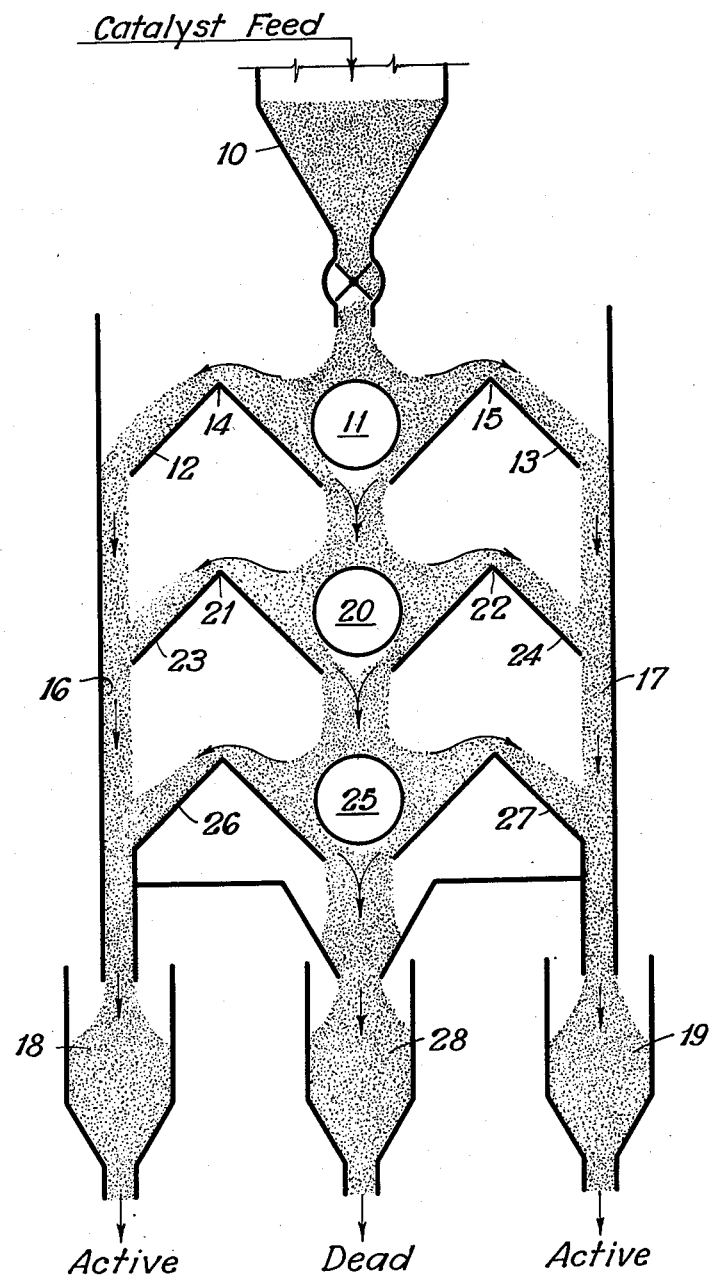

Referring to Figure 1, normally discarded catalyst from the conversion unit is fed in a thin stream by hopper 10 onto electrode 11 which is of rod or tubular construction as shown in cross section. An automatic feeder may be used to control the feed rate. The catalyst particles are charged on contact with the electrode and are scattered upward and outward in the electrostatic field existing between electrode 11 and the surrounding electrodes 12 and 13 which form a channel. Electrode plates 12 and 13 are bent downwardly to form a hurdle or ridge at 14 and 15.

The more active catalyst particles receive greater charge on contact with electrode 11 and migrate further in the electrostatic field jumping the ridges 14 and 15, and thence falling down thru channels 16 and 17 leading to active catalyst receptacles 18 and 19.

Catalyst particles which fail to be carried over the ridges 14 and 15 pass around electrode 11 and onto electrode 20 where the operation is repeated and new charges are given to the catalyst particles. More active catalyst particles pass over ridges 21 and 22 and either join the catalyst in receivers 18 and 19 or are conducted into separate catalyst receivers by means not shown. The inverted troughs 23 and 24 are similar in construction to 12 and 13. All are constructed of an electrically conducting material, preferably sheet metal. The catalyst which fails to pass the hurdles 21 and 22 then falls downward onto electrode 25 where the process is again repeated, the remaining more active catalyst particles escaping over the ridges of the surrounding electrodes 26 and 27. The operation may be repeated as many times as desired, depending on the extent of separation desired and the structural features of the apparatus. The least active catalyst passes downwardly around electrode 25 into the dead catalyst receiver 28.

Electrodes 11, 20 and 25 are interconnected and separated from the surrounding electrodes by a gap which generally exceeds one-half inch for 20,000 volts, in order to avoid arcing between the electrodes and the surrounding troughs or channels. However, if electrodes having points or sharp edges are used, the voltage gradient must be less to avoid arcing, e. g. less than about 25,000 volts per inch. If desired, the surrounding troughs may be partially constructed of non-conducting material such as sheet plastic, glass, etc., to avoid arcing, thereby enabling the troughs to approach more closely to the central electrodes for guiding the catalyst onto the electrodes below. In this case, smooth round electrode rods, not shown, can be positioned at or near the ridges. As indicated, the voltage gradient should be less than that which results in arcing and this depends on several factors, shape of electrodes, humidity, nature of catalyst, etc.

It is desirable to have the troughs surrounding the central electrodes arranged in an adjustable manner so that they can be moved closer to or farther away from the central electrode in order to adjust the distance necessary for active catalyst particles to travel before they escape from the electrostatic field. Thus, the hurdles may be adjusted so that the lower hurdles 26 and 27 are closer to the central electrode 25 than are the upper hurdles 12 and 13 to the central electrode 11. When arranged in this way the particles are subjected to fields of increasing strength and the progressively lower electrodes will separate progressively less active catalyst from the stream. Thus the catalyst may be "fractionated," each electrode separating a somewhat less active catalyst which may be employed in a different conversion process or recycled to the separator for further treatment.

Figure 2:
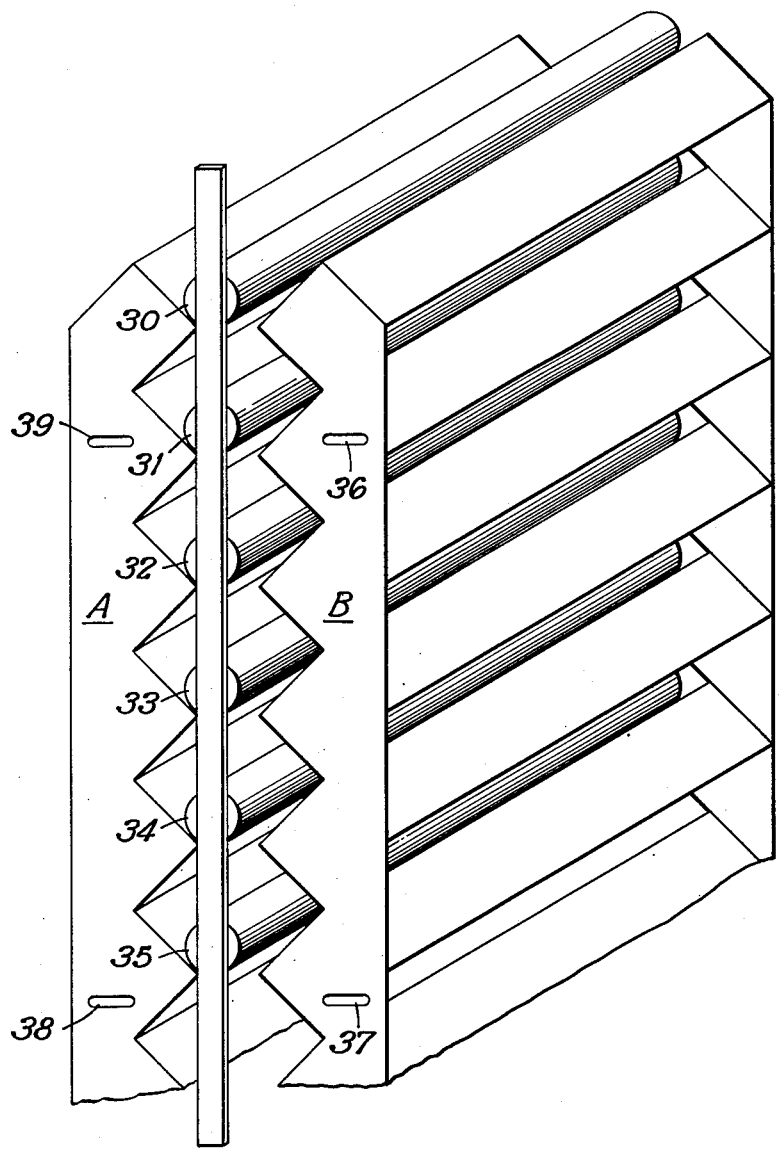
Figure 2 is a perspective drawing illustrating the separator shown in Figure 1.

The apparatus shown diagrammatically in Figure 2 is illustrated in perspective but with six electrodes instead of three. The electrodes 30 to 35 are interconnected by bar 36 which in turn is connected to a source of high voltage, either alternating current or pulsating direct current with a frequency of about 1 to 20 cycles per second. The inverted channel barriers are constructed in two units, A and B, surrounding the central electrodes. These units are movable laterally toward or away from the central electrodes, either at the top or the bottom or both, as desired, in order to obtain the optimum spacing. Slots 36, 37, 38 and 39 are provided to engage bolts fastened into an insulated housing plate at each end of the apparatus. The entire separator is enclosed in a housing which is preferably of electrically non-conducting material such as sheet plastic, Bakelite, glass, mica, wood or similar material.

Figure 3:
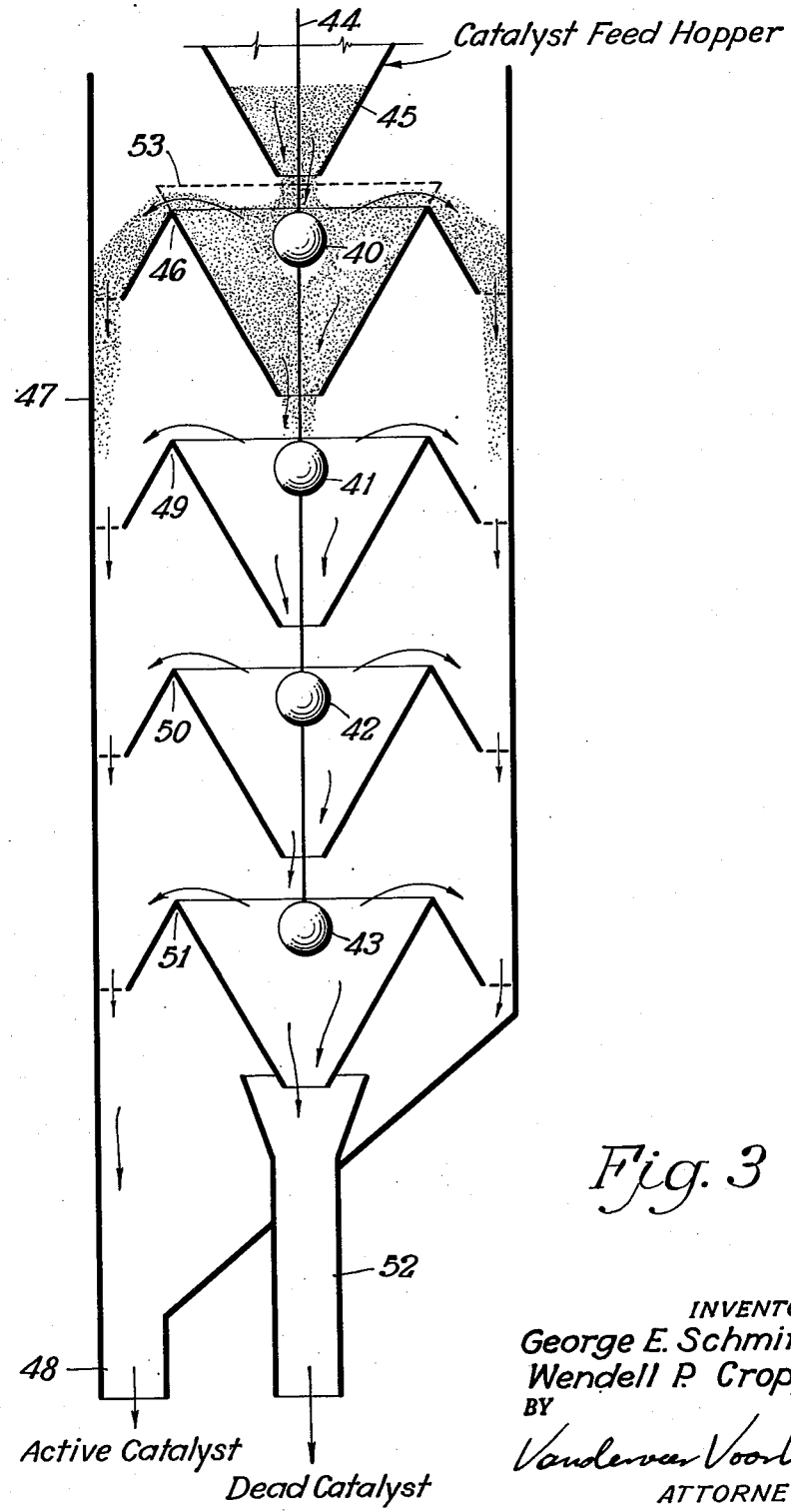
Figure 3 is a diagrammatic illustration of another form of separator of frustroconical design employing the same principle. The method of operation will be clear from a description of the drawings.

Referring now to Figure 3, the apparatus shown there is designed to operate in a similar manner to that shown in Figures 1 and 2. The electrodes, however, are small spheres 40, 41, 42 and 43 suspended on a central rod 44 connected as above. Catalyst is fed by hopper 45 onto the electrode 40 which charges the particles and drives the more active catalyst particles over the edge of the hurdle or barrier 46. Catalyst passing the barrier 46 falls down around the cones inside the housing 47 and is led off thru discharge outlet 48 at the bottom.

The less active catalyst falls thru cone or barrier 46 onto the succeeding electrodes 41, 42, 43, etc., where the operation is repeated as many times as desired, active catalyst being driven thru the successive electrostatic fields over the barriers 49, 50, 51, etc. The dead catalyst from the last electrode falls into outlet line 52.

The entire apparatus may be constructed of metal, the electrodes 40 to 43 and conductor 44 being sufficiently separated from the surrounding cones to prevent arcing. Feed hopper 45 may be constructed of plastic or other non-conducting material, if desired, and a valve, not shown, at the bottom of the hopper may be provided to regulate the flow of catalyst thru the separator. The lower end of each cone discharging catalyst may also be constructed of plastic or other non-conducting material. Other means for supporting the central electrodes 40 to 43 may be employed besides that shown, for example they may be rigidly supported on plastic rods resting inside the cones 46, 49, 50 and 51. The external cylindrical housing 47 may be a metal shell or pipe in which the cones are held in a removable position to facilitate inspection and cleaning. Housing 47 may be jointed at frequent intervals for the same purpose. This housing is ordinarily about one-half foot to two feet in diameter, depending on the construction of the cones employed, the size and shape of the central electrodes, and the voltage available for operation. If desired, units similar to that shown in Figure 3 may be operated in series, the discharged catalyst, either from 48 or 52 or both, providing the feed catalyst for the next unit or units.

Altho it is preferred to design the apparatus correctly to give the optimum performance in separating "dead" catalyst from active catalyst, variations in the character of the catalyst may make it desirable to alter the dimensions of the electrodes and cones from time to time. The central electrodes may easily be withdrawn and replaced when desired and their relative vertical position with respect to the cones may be quickly adjusted by raising and lowering the central supporting rod 44. The distance between the central electrodes and the barriers 46, 49, etc., can be increased by adding rings such as indicated by the dotted line 53.

The voltage required for the operation of the catalyst separator lies in the range of about 3000 to 15,000 volts per centimeter of distance between the central electrode and the surrounding barrier or hurdle over which active catalyst must be expelled.

Experiments have shown that the use of a constant unchanging potential is undesirable in separating live catalyst particles from dead catalyst, and in addition to this it results in bridging of the apparatus with charged catalyst particles which block the flow of catalyst from one electrode to another. We prefer to use an interrupted or an alternating potential, preferably with a frequency of about 1 to 4 cycles per second, altho higher frequencies in the range of 5 to 15 cycles per second are effective. A suitable source of electric energy of the desired characteristics is an A. C. transformer followed by a kenotron or rectifier tube and a condenser to even out the voltage wave. This high voltage direct current is then alternated with a reversing switch to give the low frequency desired.

Experiments were made under conditions substantially as follows:

*Table I*

Operating conditions:
- Voltage_____ 14,000–16,000.
- Inter-electrode distance (top)_____ 2.38 cm.
- Inter-electrode distance (bottom)_____ 1.43 cm.
- Field strength:
  - Top_____ 6,300 volts/cm.
  - Bottom_____ 10,500 volts/cm.
- Frequency_____ 2 cycles/second.
- Catalyst feed rate_____ 4.0 kg./hr.

In a series of experiments 11.3 kg. of a silica-alumina catalyst which had been employed in the cracking of gas oil and was unregenerated was charged to the separator shown in Figures 1 and 2. Three successive passes of the catalyst were made thru the separator shown in Figure 2, the "dead fraction" being reseparated twice. The following results were obtained:

*Table II*

| Fraction | Weight percent on Original | Carbon Content | Activity Estimated from Carbon Content |
|---|---|---|---|
| First Pass: | | | |
| Feed | | 1.443 | 20 |
| Dead | 18.5 | 1.247 | 16 |
| Active | 81.5 | 1.488 | 21 |
| Second Pass: | | | |
| Dead | 6.3 | 0.888 | 11 |
| Active | 12.2 | 1.40 | 19 |
| Third Pass: | | | |
| Dead | 2.7 | 0.494 | 4 |
| Active | 3.6 | 1.210 | 16 |

Actual determination of activity of third "dead" fraction was 5 IRA.

In another series of separations, a spent silica-alumina catalyst was screened into narrow ranges of particle size before passing thru the separator. This catalyst had an Indiana Relative Activity of 24 and a carbon content of 1.25 percent by weight. Three samples of catalyst were prepared, the coarsest being coarser than 115 mesh and the others having a size of 115 to 140 mesh and 140 to 230 mesh. The following table shows the results obtained on separation with cracking activity, indicated as Indiana Relative Activity, and carbon content. Separation was made on the rectangular separator as shown in Figure 2 and also on a circular separator similar to that shown in Figure 3 in which the center electrode consisted of a vertical cylindrical metal rod instead of a series of metal spheres.

*Table III*

| Screen Fraction | Rectangular Separator | | | | Circular Separator | | | |
|---|---|---|---|---|---|---|---|---|
| | Separator Fraction | Wt. Percent | IRA | Wt. Percent Carbon | Separator Fraction | Wt. Percent | IRA | Wt. Percent Carbon |
| On 115 | Inner | 30.2 | 22.6 | 1.14 | Inner | 17.6 | 17.3 | 1.08 |
| | Outer | 69.8 | 32.1 | 1.63 | Outer | 82.4 | 31.9 | 1.72 |
| 115–140 | Inner | 46.6 | 23.2 | 1.15 | Inner | 44.3 | 25.0 | 1.16 |
| | Outer | 53.4 | 28.1 | 1.37 | Outer | 55.7 | 29.9 | 1.44 |
| 140–230 | Inner | 61.9 | 21.0 | 1.11 | Inner | 49.0 | 20.0 | 1.07 |
| | Outer | 38.1 | 25.0 | 1.32 | Outer | 51.0 | 25.0 | 1.32 |

The inner or less active fraction from the rectangular separator in the specific size range of 140 to 230 mesh was resubjected in the rectangular separator to the separation process and gave 56.3% of catalyst with an activity of 20 IRA. When this material was again subjected to separation it gave about 18% of a fraction having an activity of 14.5.

Our process of catalyst separation can be applied to either new catalyst freshly prepared, preferably after roasting, or the so-called spent catalyst from a hydrocarbon conversion process containing carbonaceous deposits, "coke," up to 10% carbon on catalyst, or a regenerated catalyst which has been used in hydrocarbon conversion and subsequently regenerated by combustion with air to remove a major part of the carbonaceous materials. It is generally desirable to grade the catalyst with respect to particle size before making the electrokinetic separation, altho this is not necessary. Grading the catalyst into particle size ranges, for example 20 to 50 microns, 50 to 100 microns, and 100 to 150 microns and heavier, results in a sharper separation with fewer passes thru the apparatus. Humidity affects the separation favorably as long as it does not approach the dew point too closely.

Altho we have described our process with respect to certain specific examples, its scope should be determined by the following claims.

We claim:

1. The process of separating active from inactive finely divided inorganic oxide catalysts which comprises maintaining a pulsating electrostatic field at a pulsation frequency of about 1 to 20 cycles per second and a strength of about 3000 to 15,000 volts per centimeter, below arcing potentials, passing said catalyst into said field, expelling active catalyst particles from said field as a result of charge imparted to the active catalyst, separately collecting the more active expelled catalyst and collecting the less active catalyst fraction downwardly by gravity from said field.

2. The process of claim 1 wherein the said electrostatic field is of alternating polarity at frequencies of 1 to 4 cycles per second.

3. The process of claim 1 wherein said electrostatic field is interrupted and unidirected.

4. The process of separating active from inactive finely divided inorganic oxide catalysts characterized by a high internal surface which comprises passing a stream of said catalyst downwardly in contact with an electrode charged with a high voltage, surrounding said electrode with a pulsating electrostatic field having a frequency of about 1 to 20 cycles per second and a strength of about 3000 to 15,000 volts per centimeter, expelling the most active catalyst particles from said field, collecting the less active catalyst particles and passing them downwardly in contact with another electrode within a second electrostatic field, expelling the more active catalyst particles from said catalyst stream in said second electrostatic field and repeating the separation in additional electrostatic fields until substantially all the active catalyst has been expelled from said catalyst stream and the remaining catalyst is substantially without activity.

5. The process of separating active from inactive finely divided inorganic oxide catalysts characterized by a wide range of particle sizes, comprising the steps of grading said catalyst into a plurality of separate fractions of narrow particle size range, passing each of said fractions separately downward by gravity in contact with a central electrode charged with a high voltage, maintaining about said electrode a pulsating electrostatic field having a frequency of between about 1 and 4 cycles per second and a strength of about 3000 to about 15,000 volts per centimeter, said field acting to deflect the more active catalyst from its normal falling path within said field, separately collecting the relatively less active catalyst particles from below said field, passing the separately collected catalyst downward into another similar electrostatic field, expelling the more active catalyst particles from said catalyst in said second electrostatic field, repeating the separation in additional electrostatic fields, and separately collecting the expelled portions of the catalyst and recombining the collected expelled catalyst fractions to reconstitute a fluidizable catalyst mass of wide particle size range having relatively high activity.

6. An apparatus for electrostatic classification of finely divided catalyst of substantially uniform particle size but varying catalyst activity and varying susceptibility to electrostatic charges comprising a multiplicity of vertically spaced central electrodes having a curvilinear surface and a circular cross section and oppositely charged barrier electrode means symmetrically spaced from the curvilinear surface of each of the said central electrodes, said barrier electrode means being spaced equidistant from said central electrodes and whereby the relatively active catalyst is divided from relatively inactive catalyst in accordance with the charge retained by the catalyst particle.

7. An apparatus for electrostatically separating active from inactive catalyst particles which comprises an upstanding generally cylindrical shell, a catalyst feed hopper at the top of said cylindrical shell, a plurality of spherical electrodes vertically spaced from each other and arranged axially within said chamber below said hopper, a plurality of inverted conical electrode barrier plates arranged concentrically about said spherical electrodes in tiered relation to each other, the feed hopper discharging onto the uppermost spherical electrode within the uppermost conical electrode plate which in turn discharges onto the next lower spherical electrode within the next lower conical electrode plate, the upper edges of said respective plates providing a barrier over which active catalyst is ejected, and separate collection zones in a lower portion of said chamber for collecting particles discharged from the lowermost conical electrode separate from particles ejected over barrier plates.

8. An apparatus for electrostatically separating active from inactive catalyst particles which comprises a chamber, a catalyst feed hopper discharging into said chamber, a plurality of vertically spaced electrodes of generally cylindrical configuration arranged horizontally within said chamber below said hopper, a pair of electrode plates symmetrically aligned on opposite sides of each of said cylindrical electrodes, each of said plates having inner and outer oppositely pitched surfaces divided by a longitudinal ridge, the inner pitched surfaces discharging onto a cylindrical electrode immediately below the one with which the particular pair of plates is aligned, the ridges of said plates providing a barrier over which active catalyst is ejected to fall downwardly over the outer pitched surfaces, and the outer pitched surfaces of all the plates discharging into a collection zone within said chamber.

9. The process of separating relatively active from relatively inactive finely divided inorganic oxide catalysts comprising the steps of dropping a mixture of catalyst particles through a first separation zone while imposing an electrical charge on active particles that is greater than that on inactive particles, deflecting a portion of the active particles laterally into an upper collection zone which is laterally spaced from the said first separation zone and directing undeflected particles from said first separation zone into a lower second separation zone, dropping said last-named particles on the lower second separation zone while imposing an added electrical charge into the remaining active particles, deflecting another portion of active particles into a second separation zone which is laterally spaced from the lower second separation zone and downwardly directing undeflected particles as a separate stream from the laterally deflected active particles, collecting the deflected active particles separate from said stream, and maintaining a pulsating electrical potential across said separation zones below arcing potential and in the range of 3000 to 15,000 volts per centimeter and effecting said pulsations at the rate of 1 to 20 cycles per second.

WENDELL P. CROPPER.
GEORGE E. SCHMITKONS.

References Cited in the file of this patent

UNITED STATES PATENTS

| Number | Name | Date |
|---|---|---|
| 977,570 | Sutton | Dec. 6, 1910 |
| 2,245,200 | Johnson | June 10, 1941 |
| 2,328,577 | Oglesby | Sept. 7, 1943 |
| 2,398,792 | Johnson | Apr. 23, 1946 |
| 2,430,015 | Hatton | Nov. 4, 1947 |